United States Patent [19]

Kuge et al.

[11] 4,367,935
[45] Jan. 11, 1983

[54] CAMERA EQUIPPED WITH AN AUTOMATIC FOCUS ADJUSTING DEVICE

[75] Inventors: Takao Kuge; Takeshi Ohta, both of Hachioji, Japan

[73] Assignee: Konishiroku Photo Industry Co., Ltd., Japan

[21] Appl. No.: 221,921

[22] Filed: Dec. 30, 1980

Related U.S. Application Data

[63] Continuation of Ser. No. 974,110, Dec. 27, 1978, abandoned.

[30] Foreign Application Priority Data

Dec. 29, 1977 [JP] Japan .............................. 52-160883

[51] Int. Cl.³ .............................................. G03B 7/08
[52] U.S. Cl. ...................................... 354/25; 354/195
[58] Field of Search ........................ 354/25, 195, 198; 250/201, 202

[56] References Cited

U.S. PATENT DOCUMENTS

| | | | |
|---|---|---|---|
| 3,435,744 | 4/1969 | Stimson | 354/25 |
| 3,618,499 | 11/1971 | Harvey | 354/25 X |
| 3,720,148 | 3/1973 | Harvey | 354/25 |
| 4,093,365 | 6/1978 | Isono | 354/25 X |

Primary Examiner—John Gonzales
Attorney, Agent, or Firm—Jordan B. Bierman; Linda Bierman

[57] ABSTRACT

A camera equipped with an automatic focus adjusting device in which a photographing lens is displaceable along its optical axis and is stopped at a proper photographing position by an engaging member operated in response to a ranging signal from a ranging device. The shutter is then released in a manner which is independent of the displacement of the photographing lens.

4 Claims, 2 Drawing Figures

CAMERA EQUIPPED WITH AN AUTOMATIC FOCUS ADJUSTING DEVICE

This is a continuation of application Ser. No. 974,110 filed Dec. 27, 1978, abandoned.

FIELD OF THE INVENTION

This invention relates to an improvement in a camera equipped with an automatic focus adjusting device.

BACKGROUND

In a conventional camera equipped with an automatic focus adjusting device as disclosed in U.S. Pat. No. 3,274,914, operation of a release member will cause a charge ring to be turned by means of a spring with the result that a focus adjusting ring will follow the charge ring to displace an objective lens in the direction of its optical axis, and even when the focus adjusting ring is stopped at the position where the lens is just focused (hereinafter referred to as "focused position"), the charge ring will continue to turn to effect release of a shutter. As a result of such continuous movement of associated members, there is not sufficient time to change framing of the camera during the period of time between the focus adjustment and release of the shutter. Accordingly, once a composition of a picture to be taken is set in a view finder, it is impossible to bring a main subject to be photographed into another position in the composition of the picture.

SUMMARY OF THE INVENTION

The invention seeks to overcome such problems inherent in the conventional camera as above mentioned and it is an object of the invention to provide a camera in which the main subject is brought into the desired position in the composition after the distance to the main subject is automatically measured and then the shutter is released with the focal distance remaining unchanged. In other words, it is possible to effect release of the shutter independently even after the adjustment of focus as desired, so that it is possible to photograph with framing different from that provided at the time of ranging of the camera.

BRIEF DESCRIPTION OF THE DRAWINGS

The above and other objects and features will be clear from the following description taken with reference to accompanying drawings wherein.

DETAILED DESCRIPTION

Figure 1:
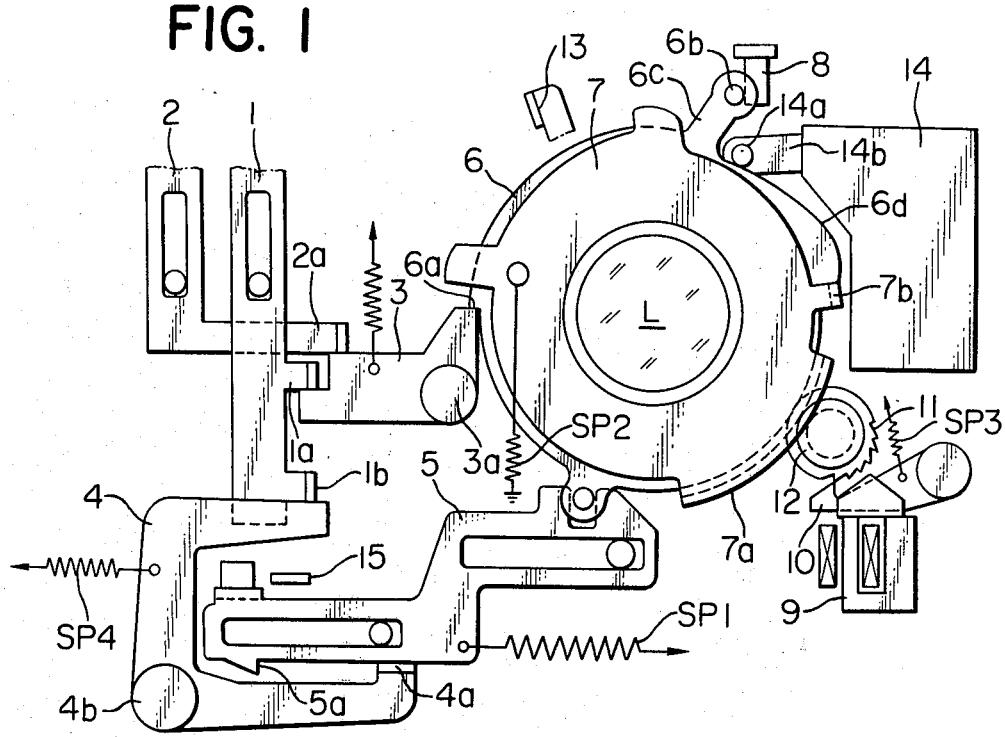
FIG. 1 is a front view of the relevant parts of one embodiment of the camera according to the invention and FIG. 2 is a front view of the parts of another embodiment of the camera according to the invention.

Referring first to FIG. 1, a release lever 1 and a focusing lever 2 are shown in parallel at the left hand side of the drawing and a part of each lever extends outside of a camera housing (not shown).

Operation will now be described with respect to the case where it is desired to photograph with the composition as set for the subject to be photographed at the time of ranging or with the composition in which a subject to be photographed is situated at a target position in a view finder, the release lever 1 has only to be pushed down. When the release lever 1 is pushed down, a first projection 1a thereof will abut against one end of a first hook lever 3 and then urge it to turn counterclockwise around a pivotal pin 3a. As a result, the first hook lever 3 will detach at its another end from a notch 6a in the charge ring 6. At a same time, the second projection 1b of the release lever 1 will push down a part of a second hook lever 4 to turn clockwise around a pivotal pin 4b against a spring SP4 with the result that a bent end 4a of the second hook lever 4 will be retracted from the position of engagement with a projection 5a of a charge lever 5.

Detachment of the first hook lever 3 will allow the charge ring 6 to turn counterclockwise by means of the charge lever 5 which is loaded by a spring SP1. As a result, a focus adjusting ring 7 will also turn counterclockwise by means of a spring SP2. The rotational speed of the charge ring 6 is controlled by contact of a pin 14a on a lever 14b of a governor 14 with a cam portion 6d formed on the charge ring 6. Further, the rotation of the focus adjusting ring 7 cannot be rotated faster than the charge ring 6, as a projection 7b mounted on the focus adjusting ring 7 is engaged with the end portion of the cam portion 6d of the charge ring 6. The charge ring 6 has a pin 6b on an arm 6c outwardly extending from the periphery of the ring 6 and a mirror pin 8 is associated with the pin 6b for controlling the movement of a movable mirror (not shown) incorporated in a ranging device (not shown) of the camera. When the movable mirror is moved by cooperation of the mirror pin 8 with the pin 6b, the ranging device will catch the subject to be ranged with the result that an electromagnet 9 will be deenergized and a claw 10 will be engaged with a latch gear 11 with the aid of a spring SP3. The latch gear 11 has a pinion 12 fixedly mounted thereon which is in mesh with a gear portion 7a formed on the focus adjusting ring 7. Thus when the latch gear 11 is latched by the claw 10, the focus adjusting ring 7 is prevented from turning and the focus of an objective lens L will be adjusted to the subject to be ranged caught by the ranging device. Even after the focus adjusting ring 7 is stopped, the charge ring 6 will be turned counterclockwise as the charge lever 5 is moved rightwards in the drawing by means of the spring SP1 without engaging with the bent end 4a of the second hook lever 4. Accordingly, the photographing operational is attained when the shutter release plate 13 is pushed by the pin 6b of the charge ring 6.

A return lever 15 is provided for returning the charge lever 5 to the position shown in FIG. 1 by interlocking a film winding lever (not shown), so that the charge ring 6 and the focus adjusting ring 7 engaging with the ring 6 at its projection 7b are also returned.

On the other hand, the operation will be described with respect to another case where it is desired to photograph with the composition changed from that set at the time of ranging or with the composition in which a main subject to be photographed is not situated at a target position in a viewfinder. A provisional composition is first set so that the main subject is positioned at the target position in the viewfinder and then the focusing lever 2 instead of the release lever 1 is pushed down. Then, the focusing lever 2 will cause the first hook lever 3 to disengage from the notch 6a of the charge ring 6 by turning the first hook lever 3 counterclockwise by the projection 2a of the lever 2 as well as the operation of the release lever 1 as afore-mentioned. However, it will readily be seen that the focusing lever 2 will have no action upon the second hook lever 4. Upon disengagement of the first hook lever 3 from the charge ring 6, the latter will turn counterclockwise by means of the spring SP1 attached to the charge lever 5 until the projection 5a of the charge lever 5 will impinge upon the bent end 4a of the second hook lever 4. The stroke between the projection 5a of the charge lever 5 and the bent end 4a of the second hook lever 4 is designed so that the focusing of the range, for example, from several meters to infinity, of the subject to be photographed is allowable. In this case, it is needless to say that the pin 6b of the charge ring 6 will be stopped at the front position of the shutter release plate 13. Namely, at the position where the charge lever 5 is stopped, there is still a small distance between the pin 6b of the charge ring 6 and the shutter release plate 13. This means that the pushing down of the focusing lever 2 is effective for focus adjustment but not for shutter release. Then, after changing the framing of the camera and shifting the position of the subject to be ranged in order to obtain the desired composition of a picture, when the release lever 1 is pushed down, the second projection 1b of the lever 1 will disengage the bent end 4a of the second hook lever 4 from the projection 5a of the charge lever 5, so that the charge lever 5 will move rightwards by means of the spring SP1. As a result, the charge ring 6 will turn counterclockwise and thus the pin 6b thereon will urge the shutter release plate 13 to permit photographing.

In the embodiment shown in FIG. 1, the release lever 1 and the focusing lever 2 are parallel, however, some modification can be incorporated in the embodiment. For example, the first hook lever 3 may be provided with an arm which extends from the lower edge of the lever 3 and is adapted to be pushed from its lateral side. This prevents wrong operation of the release lever 1 and the focusing lever 2. According to another modification, a space may be provided between the second projection 1b of the release lever 1 and the second hook lever 4 and the release lever 1 is adapted to be stopped with the aid of, for example a click stopper, in such a condition that the release lever 1 has disengaged only the first hook lever 3 from the charge ring 6 with its first projection 1a. This dispenses with the focusing lever 2.

Figure 2:
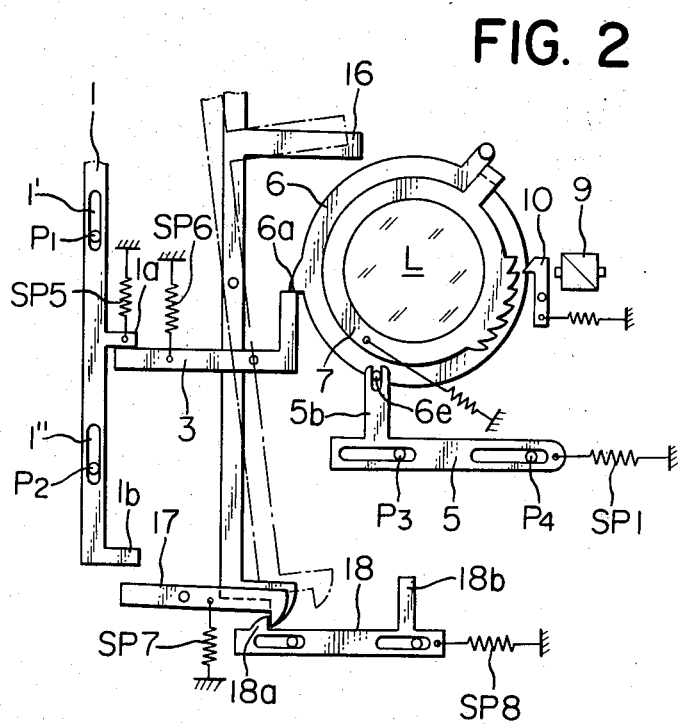

FIG. 2 shows another embodiment of the invention in which focus adjustment is effected by the release lever 1 only and then shutter release can be effected independently of the focus adjustment. In the drawings, like reference numerals indicate like or corresponding parts or components.

Referring particularly to FIG. 2, there is shown a release lever 1 which is adapted to slide down against the action of a spring SP5 and the level 1 has slots 1' and 1" with which pins P1 and P2 on the body of a camera (not shown) engage for guiding. The spring SP5 has one end secured to the first projection 1a and the other end secured to the camera body. When the release lever 1 is pushed down, the first hook lever 3 will be turned counterclockwise against the action of a spring SP6 and will be disengaged from the notch 6a of the charge ring 6 and then the charge ring 6 will be turned counterclockwise by means of the charge lever 5 which is biased rightwards by a spring SP1. This is because the charge lever 5 has an arm 5b extending at right angles from the lateral edge thereof and having a bifurcated end and the pin 6e engages the bifurcated end of the arm 5b. The charge lever 5 is also guided by guide pins P3 and P4. The focus adjusting ring 7 follows the charge ring 6. Then the focus adjusting device becomes operative to deenergize the electromagnet 9 with the result that the claw 10 will stop the focus adjusting ring 7 as already discussed in connection with FIG. 1. The charge ring 6 still continues turning even when the focus adjusting ring 7 stops. It will be seen in the drawing that the charge ring 6 strikes against a focusing completion lever 16 to turn it counterclockwise as shown by a two-dot chain line. As a result, the lever 16 is released from engagement with the projection 18a of a shutter charge lever 18.

If the pushing down operation of the release lever 1 is bolted at this moment, then focus adjustment is provided but the shutter is not released and it is thus possible to change the framing. When the release lever 1 is further pushed down so that the second projection 1b thereof will displaced a shutter hook 17, the shutter hook 17 will turn counterclockwise against the action of a spring SP7 and disengage completely from the projection 18a of the shutter charge lever 18, since the shutter charge lever 18 has already been released from engagement with the focusing completion lever 16. Disengagement of the shutter hook 17 will cause the shutter charge lever 18 to move rightwards by means of a spring SP8 with the result that the arm 18b of the lever 18 will release the shutter for effecting the photographing operation.

If it is desired to photograph with the composition as set at the time of ranging, the release lever 1 has only to be pushed down to its full extent, so that the charge ring 6 will release the focusing completion lever 16 from engagement with the shutter charge lever 18 and successively the shutter hook 17 will disengage from the shutter charge lever 18. In this way, focus adjustment and shutter release take place successively. The charge lever 5 and the shutter charge lever 18 are returned by means (not shown) associated with a winding lever in such a manner that the charge lever 5 is only returned when the shutter is not released while both the charge lever 5 and the shutter charge lever 18 are returned when the shutter is released.

According to the invention, the operations for focus adjustment and shutter release are successively and automatically carried out and the shutter release operation can be carried out subsequently to and independently of the focus adjustment operation as desired. With the camera constructed according to the invention, it is possible to photograph with the framing in which a main subject to be photographed is placed out of the ranging field of a viewfinder but without movement of the camera in taking a picture in the condition that the camera is focused onto the subject. It is also possible to confirm or reset the operation of the automatic focus adjusting device. Therefore, there can be obtained an advantageous effect that failure in photographing due to an error in ranging is minimized.

It is to be understood that the scope of the invention is not limited to the embodiments as above described but is defined by the appended claims.

What we claim is:

1. A camera equipped with an automatic focus adjusting device including ranging means, said camera comprising: mean (6) adapted to trigger a shutter release means (13) which moves in accordance with focusing operations of said camera, said shutter release means (13) being disposed on the moving path of said trigger means (6), an actuating member (1) adapted to actuate said shutter release means (13), and stop means (4) adapted to temporarily and forcedly stop said trigger means (6) at a position before said trigger means (6) reaches said shutter release means (13), and said actuating member (1), stop means (4) and trigger means (6)

being arranged in such a fashion that, after the completion of each focusing operation, said stop means (4) is released, said trigger means (6) is caused again to move toward said shutter release means (13) and the shutter is finally released by said shutter release means (13).

2. In a camera having an automatic focus adjusting means with a photographing lens displaceable along an optical axis having a ranging field, and ranging means for a main subject to be photographed and in which said ranging means and automatic focus adjusting means are operatively associated so that the lens is moved to place a subject in the ranging field in focus, the improvement comprising a focus adjusting ring mounted for rotation coaxially with the lens, a charging ring mounted for rotation coaxially with said focus adjusting ring, a first means engaging said charging ring to urge the same for movement in a counterclockwise direction, a first catch normally engaging said charging ring to prevent counterclockwise movement thereof, a spring means urging said focus adjusting ring for movement in a counterclockwise direction, a second catch on said charging ring engaging said focus adjusting ring to prevent counterclockwise movement thereof relative to said charging ring, brake means controlled by the ranging means normally engaging said focus adjusting ring to control the movement of clockwise motion of the same under action of said spring means upon release by said charging ring, a shutter release, a second means for actuating said shutter release, a third means controlling said second means for normally preventing actuation of said shutter release, and a fourth means operable to initially release said first catch to permit focusing action without actuating the shutter release, whereby the user of the camera can effect a change in picture composition, and thereafter further operable upon said third means to permit actuation of said shutter release.

3. The improvement in a camera according to claim 2, in which said first means comprises a slide engaging said charging ring and spring means acting upon said slide, said second means includes an extension on said charging ring engageable with said shutter release upon completed movement of the charging ring, said third means comprises a third catch limiting movement of said slide and thus movement of said charging ring, and in which said fourth means includes means for eventually releasing said third catch, whereby the limitation in the movement of said charging ring is removed so that the latter completes its movement and effects engagement of said extension with said shutter release.

4. The improvement in a camera according to claim 2, in which said second means comprises a slide having an arm adapted to actuate said shutter release, an engageable projection, and spring means acting upon said slide to urge said arm for movement toward said shutter release, said third means comprises a pair of third and fourth pivotally mounted catches engageable with said projection to prevent movement of said arm toward said shutter release, and said fourth means includes means responsive to movement of said charging ring for moving said third catch out of engagement with said projection upon release of said first catch, and further means operable upon said fourth catch out of engagement with said projection to release said slide and thereby permit movement of said arm against said shutter release.

* * * * *